Patented July 4, 1933

1,917,039

UNITED STATES PATENT OFFICE

PAUL KLEIN, OF BUDAPEST, HUNGARY, AND ANDREW SZEGVARI, OF AKRON, OHIO, ASSIGNORS TO AMERICAN ANODE INC., OF AKRON, OHIO

METHOD OF CLEANING MOLDS

No Drawing. Application filed April 13, 1927, Serial No. 183,607, and in Hungary April 15, 1926.

This invention relates to processes for the direct manufacture of formed articles from aqueous dispersions of rubber and rubber-like compositions, and particularly to processes in which articles are deposited from such dispersions onto porous molds.

In the Patent No. 1,584,689, of August 4, 1925, there is described a process of this character in which rubber articles are made directly from aqueous dispersions of rubber or rubber compositions by electrical means and in which process the deposit is formed on porous molds, such as unglazed earthenware molds. The present invention relates to an improvement in the process of the above mentioned patent and is applicable to other processes involving the manufacture of formed articles by deposition from aqueous dispersions of rubber and similar compositions onto porous mold or forms. An object of this invention is to provide a process of the above described character and particularly to provide a process in which the porous mold may be repeatedly employed in the carrying out of this process.

It has been found in the electrodepositing of rubber articles that the porous molds after having been repeatedly employed as depositing backings, no longer produce goods with the same facility or of the same uniformity and homogeneity. Thus, blisters, thin spots and other defects may occur in the deposits formed upon molds which have been repeatedly or continuously used, and the electric resistance of such molds is higher. This behaviour of the molds is believed to be due to the fact that during the electrophoretic deposit from the rubber dispensions the original properties of the porous electrolyte-impregnated molds undergo certain changes owing to either one or more of the following causes: the disturbance by the passage of the unidirectional electric current through the molds of the distribution of the electrolyte with which the molds are impregnated, the penetration of constituents of the rubber dispersion into the pores of the molds, and/or the formation of insoluble precipitate by the action of the electrolyte with which the molds are impregnated with substances present in the rubber dispersion or other liquids which come in contact with the mold surface, or in the air, which precipitates collect within the pores of the molds and/or on the surfaces of the molds.

It is the purpose of the present invention to employ in processes of the character indicated added steps comprising the treatment of the porous molds from time to time as they are employed repeatedly or continuously as forms onto which the rubber composition is deposited, in certain instances after each time they are used, to restore the molds partly or entirely to their original condition.

It has been found that the restoration of a porous mold such as an unglazed earthenware mold commonly used in these processes, can generally be effected by placing the mold in an electrolytic bath between suitable electrodes and passing an electric current through the mold. It is preferable that the electric connections be made in such way that the current traverses the mold in a direction opposite to that which the dispersed substance travels toward the mold during the deposition, but this is not essential. This treatment not only tends to remove the foreign substances introduced into the pores during the deposition, but where the electrolyte employed is that with which it is desired to impregnate the mold prior to the deposition, it also restores the original state of distribution of the electrolyte within the porous mold. It is to be understood that this process is applicable not only to earthenware molds but also to molds made of other porous materials, as for example gypsum molds, molds of fibrous materials, etc.

It is also possible to restore the molds to a usable condition by rinsing the mold with a liquid, as by passing a liquid under pressure through the pores of the molds, preferably in a direction opposite to that in which the particles travel from the rubber dispersion to the mold during deposition. The liquid employed may be an alkali solution, such as ammonium water, or may be an electrolyte solution of the type with which the molds are to be impregnated prior to the deposition process, or strong acid, which thereafter has to be washed out and/or neutralized. In certain cases, the treatment of the molds with liquids as hereinabove described is sufficient to restore the mold to satisfactory operative condition, but in other cases it may be desirable to employ both the electric treatment and the pressure liquid treatment hereinabove described.

In certain other cases where organic colloids penetrate into the pores of the mold during deposition, they can be removed by heating the molds to a dull red heat. This means may be employed as a supplement to either or both of the other two means hereinabove described, particularly where these methods are not capable of removing the lodged organic or other particles, or in certain cases it alone has been found to be sufficient to restore the molds to a working condition. Molds which deteriorate upon heating obviously cannot be subjected to this process.

Where water insoluble precipitates are formed on the surfaces or in the pores of the mold, further means of restoration are sometimes necessary. Thus, where soluble calcium compounds are present in the electrolyte employed, calcium carbonate is precipitated on or in the molds by the action of carbonates present in the rubber dispersion, or by carbonic acid. This precipitate may be removed by dipping the molds into an acid bath, preferably of hydrochloric acid in three to ten percent concentration. The mold should then be washed to remove the acid, or the acid may then be neutralized. The molds may then be treated by any one or more of the above indicated methods of restoration.

The term "rubber" is used in this specification and in the appended claims in a generic sense to include caoutchouc, balata, gutta percha, and other rubber like substances, whether unvulcanized or vulcanized, or reclaimed, and whether or not admixed with other ingredients.

It will be understood that numerous variations and changes may be made in the above indicated processes without departing from the principles of the invention therein described and recited in the appended claims.

We claim:

1. The method of cleaning a porous electrodepositing mold which comprises, mechanically removing solid particles from the pores of the mold by forcing a fluid therethrough, immersing the mold in an electrolytic solution, and passing an electric current therethrough in a direction opposite to that used in the electrodeposition.

2. The method of cleaning a porous electrodepositing mold which comprises heating the mold to a red heat to eliminate organic materials from the pores thereof, immersing the mold in an electrolytic solution, passing an electric current therethrough in a direction opposite to that used in the electrodeposition.

3. The method of cleaning a porous electrodepositing mold which comprises mechanically removing solid particles from the pores of the mold by forcing a fluid therethrough, heating the mold to a red heat to eliminate organic materials from the pores thereof, immersing the mold in an electrolytic solution, and passing an electric current therethrough, in a direction opposite to that used in the electrodeposition.

4. The method of cleaning porous electrodepositing molds which comprises immersing the molds in an electrolytic solution and passing an electric current through the molds in a direction opposite to that used in the electrodeposition.

5. The method of cleaning porous electrodepositing molds which comprises mechanically removing solid particles from the pores of the mold by forcing a fluid therethrough, immersing the mold in an electrolytic solution and passing an electric current through the mold in a direction opposite to that used in the electrodeposition.

6. The method of cleaning porous electrodepositing molds which comprises mechanically removing solid particles from the pores of the mold by forcing a fluid therethrough, heating the mold to a red heat to eliminate organic materials from the pores thereof, immersing the mold in an electrolytic solution, and passing an electric current through the mold in a direction opposite to that used in the electrodeposition.

In witness whereof we have hereunto set our hands this 23rd day of March 1927.

PAUL KLEIN.
ANDREW SZEGVARI.